United States Patent
Yüksel et al.

(10) Patent No.: US 12,189,402 B2
(45) Date of Patent: Jan. 7, 2025

(54) METHOD AND CONTROL UNIT FOR CONTROLLING AN OVERDETERMINED SYSTEM, SYSTEM AND AIRCRAFT

(71) Applicant: Volocopter GmbH, Bruchsal (DE)

(72) Inventors: Burak Yüksel, Mannheim (DE); Johannes Stephan, Stuttgart (DE)

(73) Assignee: Volocopter GmbH, Bruchsal (DE)

( * ) Notice: Subject to any disclaimer, the term of this patent is extended or adjusted under 35 U.S.C. 154(b) by 471 days.

(21) Appl. No.: 17/729,089

(22) Filed: Apr. 26, 2022

(65) Prior Publication Data

US 2022/0374028 A1    Nov. 24, 2022

(30) Foreign Application Priority Data

Apr. 29, 2021    (DE) .......................... 102021111104.8

(51) Int. Cl.
| | |
|---|---|
| G05D 1/08 | (2006.01) |
| B64C 27/08 | (2023.01) |
| B64D 31/06 | (2006.01) |
| G05D 1/00 | (2006.01) |

(52) U.S. Cl.
CPC ........... G05D 1/0825 (2013.01); B64C 27/08 (2013.01); B64D 31/06 (2013.01); G05D 1/0808 (2013.01); G05D 1/0858 (2013.01); G05D 1/101 (2013.01)

(58) Field of Classification Search
None
See application file for complete search history.

(56) References Cited

U.S. PATENT DOCUMENTS

| | | |
|---|---|---|
| 2017/0152033 A1 | 6/2017 | Allen |
| 2019/0391598 A1 | 12/2019 | Murakoshi et al. |
| 2020/0103922 A1 | 4/2020 | Nonami et al. |
| 2021/0072771 A1 | 3/2021 | Zwiener et al. |
| 2021/0107626 A1 | 4/2021 | Yuksel |
| 2022/0250766 A1* | 8/2022 | Yüksel et al. .......... G05D 1/102 |

FOREIGN PATENT DOCUMENTS

| | | |
|---|---|---|
| DE | 102010040770 | 8/2012 |
| DE | 102019101903 | 7/2020 |

* cited by examiner

*Primary Examiner* — Arun Goyal
*Assistant Examiner* — William L Breazeal
(74) *Attorney, Agent, or Firm* — FIG. 1 Patents

(57) ABSTRACT

A method for controlling an overdetermined system with multiple power-restricted actuators that perform a primary task and non-primary tasks, including: a) determining a pseudo-control command based on a physical model of the system, which pseudo-control command represents the torques and a total thrust force acting on the system, b) determining a control matrix, c) dissociating the control matrix into sub control matrices, wherein the sub control matrices and the corresponding sub pseudo-control commands correspond to the primary task for i=1 and for i>1 correspond to the non-primary task(s) and a priority of the non-primary tasks decreases with increasing index i, d) determining actuator control commands for solving the primary task, e) projecting the non-primary tasks into the null space of the primary task, and into respective null spaces of all of the non-primary tasks of higher priority, if present, and f) providing the actuator control commands from d) and e) at the actuators.

21 Claims, 4 Drawing Sheets

METHOD AND CONTROL UNIT FOR CONTROLLING AN OVERDETERMINED SYSTEM, SYSTEM AND AIRCRAFT

INCORPORATION BY REFERENCE

The following documents are incorporated herein by reference as if fully set forth: German Patent Application No. 10 2021 111 104.8, filed Apr. 29, 2021.

TECHNICAL FIELD

The invention relates to a method for controlling an overdetermined system with multiple actuators, for example an aircraft with multiple propulsion units.

The invention also relates to a control unit for controlling an overdetermined system with multiple actuators, for example an aircraft with multiple propulsion units.

The invention further relates to an overdetermined system with multiple actuators.

Finally, the invention also relates to an aircraft with multiple propulsion units and optionally further actuators, such as movable flaps or winches, which together form an overdetermined system.

BACKGROUND

Airplanes, aerial vehicles or aircraft with overdetermined actuation ("over-actuation", i.e. the airplane has a larger number of actuators than is necessary for the execution of so-called primary tasks in its control volume) offer the possibility of realizing a primary task with more than one solution. This intuitively implies that, depending on the airplane type, the actuator type and the tasks defined in the control volume, there may be additional room to perform one or more other (non-primary) tasks.

Depending on the airplane maneuver, environmental conditions, failure scenarios or other effects, it may happen that the airplane is operated close to the limits of its control volume. This means that the physical forces and moments (torques) that can be provided by the actuators and control surfaces (flaps, wings, etc.) are possibly not sufficient to control all of the control axes of the airplane at all points in time—in the case of the "VoloCity" multicopter produced by the applicant these are the rolling axis (longitudinal axis), the pitching axis (transverse axis), the yawing axis (vertical axis) and the (total) thrust. Another airplane type may, depending on the arrangement of the actuators, have different control axes, in particular two additional horizontal thrust axes. In such situations, the safety and controllability of the airplane can be ensured by one or more control axes being prioritized over the others, for example the rolling and pitching axes over the yawing axis. It is in this case important to ensure that a control axis with low priority does not adversely affect the control axis (axes) with high priority (for example if yawing has a lower priority than rolling and pitching, the yawing control must not lead to an adverse effect on rolling and pitching).

This isolation of different priorities in the control is not a trivial task. Generally, combining different tasks with a respective priority in such a way that low-priority tasks do not affect high-priority tasks is a complex challenge. The way secondary or third-level (tertiary or generally non-primary) tasks are added to a control and allocation problem (assignment problem) can substantially affect the available performance for solving a primary task and the stability of that solution.

In European patent application 19 212 935.1, the applicant proposes a method for operating an eVTOL aerial vehicle with 18 rotors, in which the primary control assignment finds a solution with so-called "L-2" minimization for the provision of the required thrusts and torques, while imposing a secondary and lower priority (not primary) compulsion to reduce the maximum LTU (lift thrust unit) power. This is carried out by changing the gain parameters of the assignment problem as a function of the deviation of an LTU value (the revolution rate—RPM) from the corresponding average value of the total LTUs (so-called "L-inf" minimization). Two tasks are carried out in one step, which makes it impossible to assign a different priority or criticality to the different goals. In addition, a failure or erroneous behavior when achieving a goal with lower criticality (for example a secondary goal) can negatively affect solving a task with higher criticality (for example a primary goal).

SUMMARY

The invention is based on the object of remedying the situation here and specifying a method, a control unit, a system and an aerial vehicle or an aircraft of the respective type mentioned, with which, in addition to the solution of at least one primary task, the solution of at least one non-primary task is possible without adversely affecting the primary task or its solution. The same is generally intended to apply to relatively higher-priority tasks over relatively lower-priority tasks.

This object is achieved by a method with one of more of the features disclosed herein, by a control unit with one of more of the features disclosed herein, by a system with one of more of the features disclosed herein, and by an aircraft with one of more of the features disclosed herein.

Preferred further developments are defined below and in the claims.

A method according to the invention for controlling an overdetermined system with multiple power-restricted actuators (number k), in particular an aircraft with multiple propulsion units, wherein the actuators perform at least one primary task and a number of non-primary tasks, includes:

a) determining a pseudo-control command $u_p \in \mathbb{R}^{p'}$ based on a physical model of the system, which pseudo-control command represents in particular the torques (L, M, N) and a total thrust force (F) acting on the system, b) determining a control matrix D, $D \in \mathbb{R}^{p' \times k}$, according to $u_p = Du$, wherein u denotes actuator control commands, c) dissociating the control matrix D into sub control matrices $D_i$ according to $$D = \begin{bmatrix} D_1 \\ \vdots \\ D_q \end{bmatrix},$$

$q \leq p'$, so that $$u_p = \begin{bmatrix} u_{p,1} \\ \vdots \\ u_{p,q} \end{bmatrix} \text{ and } u_{p,i} = D_i u,$$

wherein the sub control matrices $D_i$ and the corresponding sub pseudo-control commands $u_{p,i}$ for i=1 correspond to the primary task and for i>1 correspond to the at least one non-primary task and wherein a priority of the non-primary tasks decreases with increasing index i, d) determining the actuator control commands for solving the primary task according to $u_1 = D_1^\# u_{p,1}$, where #denotes a matrix inversion and $u_1 \in \mathbb{R}^k$ comprises those actuator control commands which solve the primary task, with $u_1 \in U := \{u \in \mathbb{R}^k | u^{min} \leq u \leq u^{max}\}$, e) projecting the non-primary tasks, i>1, into the null space of the primary task, i=1, and into the respective null space of all of the non-primary tasks of higher priority, if present, so that $D_i u_j = 0$, with $u_j \in \mathbb{R}^k$, j>i, comprises actuator control commands for performing a non-primary task, and f) providing the actuator control commands from d) and e) at the actuators.

The term "restricted" or "power-restricted" means in this context that the actuators have physical power limits, that is to say cannot perform every conceivable technical task (which applies in principle to any machine).

It correspondingly applies for the actuator control commands u, that $u \in U := \{u \in \mathbb{R}^k | u^{min} \leq u \leq u^{max}\} \subset \mathbb{R}^k$ denotes a specific range of values of restricted actuator control commands.

A control unit according to the invention for controlling an overdetermined system with multiple power-restricted actuators (number k), in particular an aircraft with multiple propulsion units, wherein the actuators perform at least one primary task and at least one non-primary task, is designed and set up, in particular software technically, for a) determining a pseudo-control command $u_p \in \mathbb{R}^{p'}$ based on a physical model of the system, which pseudo-control command represents in particular the torques (L, M, N) and a total thrust force (F) acting on the system, b) determining a control matrix D, $D \in \mathbb{R}^{p' \times k}$, according to $u_p = Du$, wherein u denotes actuator control commands, c) dissociating the control matrix into sub control matrices $$D = \begin{bmatrix} D_1 \\ \vdots \\ D_q \end{bmatrix},$$

$q \leq p'$, so that $$u_p = \begin{bmatrix} u_{p,1} \\ \vdots \\ u_{p,q} \end{bmatrix} \text{ and } u_{p,i} = D_i u,$$

wherein the sub control matrices $D_i$ and the corresponding sub pseudo-control commands $u_{p,i}$ for i=1 correspond to the primary task and for i>1 correspond to the at least one non-primary task and wherein a priority of the non-primary tasks decreases with increasing index i, d) determining the actuator control commands for solving the primary task according to $u_1 = D_1^\# u_{p,1}$, where #denotes a matrix inversion and $u_1 \in \mathbb{R}^k$ comprises those actuator control commands which solve the primary task, with $u_1 \in U := \{u \in \mathbb{R}^k | u^{min} \leq u \leq u^{max}\}$, e) projecting the non-primary tasks, i>1, into the null space of the primary task, i=1, and into the respective null space of all of the non-primary tasks of higher priority, if present, so that $D_i u_j = 0$, if $u_j \in \mathbb{R}^k$, j>i, comprises actuator control commands for performing a non-primary task, and f) providing the actuator control commands from d) and e) at the actuators.

The control unit may be further designed and set up to carry out further developments described below of the method according to the invention.

Furthermore, the control unit may be actively connected to devices for measuring and/or determining parameters and states of the system and/or the actuators which are required for the determination of the pseudo-control command according to step a), in particular by a main flight control unit of an aircraft.

An overdetermined system according to the invention comprises multiple actuators actively connected to a control unit according to the invention.

An aircraft according to the invention comprises multiple propulsion units and optionally further actuators, such as movable flaps or winches, which together form an overdetermined system according to the invention, in particular in the form of a multicopter with a number of preferably electrically driven rotor units.

"Actuators" are understood in the present case to mean in particular, but not exclusively, propulsion units, such as rotor units or the like. In addition, depending on the design of the system (the aerial vehicle), there are other means, such as flaps, winches, etc. or generally means of operation, which the system needs to perform certain physical tasks.

A method for assigning control priorities to overdetermined systems, and specifically airplanes, in which low-priority tasks are projected into the null space of higher-priority tasks is proposed. This ensures that the low-priority tasks do not adversely affect the high-priority tasks.

A method for prioritizing control axes of a system (airplane) with overdetermined actuators by using its null space is proposed here in particular. With the method presented here, in the case of an airplane the control of the rolling axis can be prioritized over the control of the pitching axis, or the control of the rolling and pitching axes over the control of the yawing axis, or the control of the rolling and pitching axes over the control of the yawing axis over the altitude control, and so on. The combination of the priorities may be chosen as desired, and an underlying algorithm, which may preferably be implemented in software form in one configuration of the control unit according to the invention, can be applied to all such combinations.

It can be seen as a preferred feature that, on account of the use of the null space of the control matrix, a goal/task with lower priority cannot affect the task(s) with higher priority. For example, a tertiary task cannot affect the secondary and primary tasks, and a secondary task cannot affect the primary task.

The presented method can also be used for quaternary, quinary or other tasks if there is still appropriate room in the null space. If there is no more room in the null space, lower-priority tasks are advantageously simply ignored due to the definition of the null space.

In the present case, "null space" is to be understood as the core of a (linear) mathematical representation. The core of a linear representation f: V→W between vector spaces V, and W consists of those vectors in V which are mapped onto the zero vector in W; it is therefore the solution set of the homogeneous linear equation f(x)=0 and is therefore also referred to as a null space.

Looking at the example from EP 19 212 935.1, the primary task may be to find the solution of the control assignment to generate the required (total) thrust and the required torques with "L-2 minimization". Accordingly, a secondary, i.e. non-primary, task can be the reduction of the maximum LTU power with "L-inf minimization". If this secondary task is projected into the null space of the primary task according to the present invention, it is ensured that it does not affect the solution of the primary task. This is desirable for safety reasons, as the primary task is essential, but the secondary task is only preferable. In addition, another subordinate (for example tertiary task) can be assigned, for example reducing the power of a particular (or multiple) LTU(s) to for example 75% because the propulsion unit in question has overheated or was classified as faulty. As part of a corresponding further development of the invention, the tertiary task is projected into the null space of the primary and secondary tasks, so that it does not adversely affect the higher-prioritized tasks.

In the example above, the secondary and tertiary tasks can swap places depending on the requirement and prioritization. Within the scope of the present application, the priorities of the individual (control) tasks result from the respective specific application (more details on this further below).

It should be emphasized that the idea proposed here provides an extremely advantageous separation of tasks according to their respective criticality, which can be used for assigning different design assurance levels (DAL) of functions with different criticalities and goals. This has a noticeable influence on the reduction of the development costs of safety-critical devices, such as specifically aerial vehicles.

Although reference has been repeatedly made here and below to aerial vehicles, the described method is also generally suitable for controlling overdetermined actuator systems of any kind.

At this point, first the mathematical-physical background of the invention—in particular with regard to aerial vehicles—will be briefly discussed in more detail in order to facilitate understanding.

The equations of motion of systems which can be derived with the Newton-Euler principle or the Lagrange method can be represented as follows:

$$M(x)\ddot{x}+c(x,\dot{x})+g(x)+G(x)u_p=f_{ext}, \qquad \text{Equation 1}$$

wherein $x \in \mathbb{R}^m$ denotes the m-dimensional configuration vector of the system, for example positions and rotations in 3D, $M(x) \in \mathbb{R}^{m \times m}$ denotes the state-dependent generalized inertial torque, $(c,\dot{c}) \in \mathbb{R}^m$ denotes the state-dependent Coriolis forces, $g(x) \in \mathbb{R}^m$ denotes the gravitational forces, and $f_{ext} \in \mathbb{R}^m$ are the external forces and torques, for example due to aerodynamics, contact, etc. The required physical control commands (or pseudo-control commands) for the system are designated as $u_p \in \mathbb{R}^{p'}$, which are for example calculated with a feedback control law and used to control the system. These pseudo-control commands are the body-fixed forces and torques acting on the system through different actuators, and they each enter the system dynamics given in equation 1 with a rule input matrix $G(x) \in \mathbb{R}^{m \times p'}$. These matrices contain in particular the information about an over- or under-actuation.

For the calculation of $u_p$, control methods (or laws) are used (for example direct dependencies or feedback control laws, etc.). The connection between these calculated control commands and the actual actuator control commands $u_p, u \in \mathbb{R}^k$ is made by means of an assignment or allocation problem, which contains in particular the geometric knowledge about the positioning of the actuators in the system and other actuator-relevant configurations and properties. The following applies:

$$u_p=Du, \qquad \text{Equation 2}$$

with $u \in U:=\{u \in \mathbb{R}^k | u^{min} \leq u \leq u^{max}\} \subset \mathbb{R}^k$, wherein $D \in \mathbb{R}^{p' \times k}$ defines the so-called control effectiveness matrix (in short: control matrix). According to the use of control methods—as mentioned above—the pseudo-control commands $u_p \in \mathbb{R}^{p'}$ are first calculated. However, these must be distributed to the physical actuators in the form of the actual control commands $u \in \mathbb{R}^k$ (actuator control commands), which is commonly known as the control mapping problem or allocation problem. Therefore, a type of inverse matrix calculation (identified below by the superscript "#") is required to calculate u from $u_p$. This is represented by $$u=D^{\#}(W,u^{min},u^{max})u_p, \qquad \text{Equation 3}$$

wherein this inversion is usually carried out taking into account a weight or weighting matrix $W_i \in \mathbb{R}^{k \times k}$ and the physical limits of each actuator, for example $u^{min} \in \mathbb{R}^k$ and $u^{max} \in \mathbb{R}^k$, wherein $\forall i=1, \ldots, k: u_k^{min} \leq u_i \leq u_k^{max}$.

$A=D^{\#}(W,u^{min},u^{max}) \in \mathbb{R}^{k \times p'}$ is referred to as the "control mapping matrix" (or the allocation matrix).

Note: If $M \in \mathbb{R}^{k \times p}$ is a matrix with rank(M)=p, then $M^{\#}$denotes the right inverse, so that $M M^{\#}=I$. It is the standard matrix inverse $M^{\#}=M^{-1}$ for k=p' and—ignoring the weighting matrix W and the limits $u^{min}$, $u^{max}$—the pseudo-inverse $M^{\#}=M^T(M M^T)^{-1}$ for k>p'.

For an aerial vehicle, such as the 18-rotor Volocopter® (model "VC200", "VoloCity" or "VoloDrone") from the applicant's company, $u_p \in \mathbb{R}^4$ represents a vector which contains the required (control) thrust and the three-dimensional (actuation) torques which act on the aerial vehicle with regard to its center of gravity. Furthermore, $u \in \mathbb{R}^{18}$ is a vector which contains the eighteen (18) desired rotor control commands.

The distributed actuator control commands u were calculated above using the mapping matrix $A \in \mathbb{R}^{k \times p'}$, which is a result of a matrix inversion problem. For systems with a redundant number of actuators (i.e. k>p'), there may be more than one solution to this inversion problem if the control matrix has enough linearly dependent columns (this is known to those skilled in the art who are familiar with linear algebra). In this application, such systems are referred to as "overdetermined systems".

The presence of more than one solution to the inversion problem creates the possibility of a "null space" different from zero which can be used for other (secondary or tertiary or generally lower-prioritized) tasks without affecting overarching goals (tasks or their solutions).

Definition of the Control Axes

The (control) matrix D establishes a relationship between the physical control axes $u_p$ (for example torques and thrust) and the actual actuator commands u on the basis of the relationship $u_p=Du$. To allow prioritization of the control axes, the following division is proposed:

$$u_p = \begin{bmatrix} u_{p,1} \\ u_{p,2} \\ \vdots \\ u_{p,q} \end{bmatrix},$$

$$D = \begin{bmatrix} D_1 \\ D_2 \\ \vdots \\ D_q \end{bmatrix},$$

$$q \leq p,$$

where: $u_{p,i}=D_i u$. Here, $u_{p,i}$ denotes a subset of the control axis concerned. It may be a single control axis, if $\dim(u_{p,i})=1$, or multiple control axes, if $1<\dim(u_{p,i})<p$.

For example, $u_{p,1}$ may be the rolling and pitching moment ($\dim(u_{p,1})=2$), $u_{p,2}$ may be the yawning moment ($\dim(u_{p,2})=1$), and $u_{p,3}$ may be the thrust ($\dim(u_{p,3})=1$).

Null Space

The null space, also known as the core, of a matrix $D_i \in \mathbb{R}^{p \times k}$ is the set of all vectors v, so that $D_i v=0$. Therefore, the null space of the matrix $D_i v=0$ can be defined as:

$$N(D_i)=\{v|D_i v=0\}.$$

Calculation of the Null Space

A possible representation of the null space of a matrix D can be calculated according to:

$$N(D)=I-D^T(D^\#)^T \in \mathbb{R}^{k \times k},$$

wherein $I \in \mathbb{R}^{k \times k}$ is a k×k identity matrix. The superscript character # implies the inversion (standard inversion if the matrix is quadratic, or pseudo-inversion if not), and the superscript character T implies the transposing operation.

Task Prioritization by Means of Null Space Projection

The control matrix D can be divided into smaller matrices (dissociated), the number of this division, separation or dissociation depending on the number of tasks/goals to be accomplished:

$$D=[D_1^T D_2^T D_3^T \ldots D_q^T]^T,$$

where $q \leq p$ is the number of tasks or goals to be performed. The smaller its index, the more important it is for it to be performed, and the task concerned (the goal concerned) is prioritized over the other tasks/goals.

For example, the goal with the highest priority is assigned using $D_1$ (corresponding to $u_{p,1}$). Accordingly, the secondary goal is assigned using $D_2$ (corresponding to $u_{p,2}$), etc.

Example of an Application with Three Tasks/Goals:

Primary Goal

It is the case that $$u_1 = D_1^\# u_{P,1},$$

wherein $u_1 \in \mathbb{R}^k$ is the vector which contains the actuator commands (or actuator control commands) which achieve the primary goal of generating the required physical control commands $u_{p,1}$. The mapping generates executable commands, with $$u_1 \in U := \{u \in \mathbb{R}^k | u^{min} \leq u \leq u^{max}\}\}.$$

Secondary Goal

Now considered is $u_2 \in \mathbb{R}^k$, which is calculated to achieve a secondary goal in order to generate the required physical control commands $u_{p,2}$ without disturbing the primary goal. For this purpose, $u_2$ is suitably calculated and projected onto the null space of the control matrix $D_1$ used for the primary goal, preferably as follows:

$$u_2^{org}=D_2^\#(u_{p,2}-D_2 u_1),$$

$$N_2=I-D_1^T(D_1^\#)^T,$$

$$u_2=N_2 u_2^{org}.$$

A corresponding further development of the method according to the invention provides that first $u_2^{org} \in \mathbb{R}^k$ is calculated, in order to solve a first, non-primary task, preferably according to $u_2^{org}=D_2^\#(u_{p,2}-D_2 u_1)$, and subsequently $u_2^{org}$ is projected onto the null space $N_2(D_1)$ of the sub control matrix $D_1$ according to $u_2=N_2 u_2^{org}$, wherein preferably $N_2=I-D_1^T(D_1^\#)^T$.

In order to ensure the feasibility of the overall command so that $u \in U$, preferably the following limits must be adhered to in the secondary assignment step:

$$u_2^{org} \in U := \{u_2^{org} \in \mathbb{R}^k | u^{min}-u_1 \leq N_2 u_2^{org} \leq u^{max}-u_1\}.$$

A corresponding further development of the method according to the invention provides that for $u_2^{org}$ it is specified that $u_2^{org} := \{u_2^{org} \in \mathbb{R}^k | u^{min}-u_1 \leq N_2 u_2^{org} \leq u^{max}-u_1\}$. It follows from this that: $u_1+u_2 \in U$.

The complete actuator command, which ensures that the primary goal is not affected by the secondary goal (if there is no tertiary goal), preferably looks as follows:

$$u=u_1+u_2.$$

A corresponding further development of the method according to the invention provides that a complete actuator control command u is calculated as follows: $u=u_1+u_2$.

Tertiary Goal

Considered is $u_3 \in \mathbb{R}^k$, which is calculated to achieve a tertiary goal in order to generate the required physical control commands $u_{p,3}$ without at the same time disturbing either the primary goal or the secondary goal. Then $u_3$ is projected onto the null space of the control matrices $D_1$, $D_2$ used for the primary goal and for the secondary goal, preferably according to:

$$u_3^{org} = D_3^\#(u_{p,3} - D_3(u_1 + u_2)),$$

$$N_3 = \left(I - \begin{bmatrix} D_1 \\ D_2 \end{bmatrix}^T \left(\begin{bmatrix} D_1 \\ D_2 \end{bmatrix}^\#\right)^T\right),$$

$$u_3 = N_3 u_3^{org}.$$

A corresponding further development of the method according to the invention therefore provides that subsequently $u_3^{org} \in \mathbb{R}^k$ is calculated in order to solve a second, non-primary task, preferably according to $u_3^{org}=D_3^\#(u_{p,3}-D_3(u_1+u_2))$, and subsequently $u_3^{org}$ is projected onto the null space $N_3(D_1, D_2)$ of the sub control matrices $D_1$, $D_2$ according to $u_3=N_3 u_3^{org}$, wherein preferably $$N_3 = \left(I - \begin{bmatrix} D_1 \\ D_2 \end{bmatrix}^T \left(\begin{bmatrix} D_1 \\ D_2 \end{bmatrix}^\#\right)^T\right).$$

In order to ensure the feasibility of the overall command so that $u \in U$, the following limits must preferably be adhered to in the tertiary assignment step:

$$u_3^{org} \in U_3 := \{u_3^{org} \in \mathbb{R}^k | u^{min}-u_1-u_2 \leq N_3 u_3^{org} \leq u^{max}-u_1-u_2\}.$$

A corresponding further development of the method according to the invention therefore provides that for $u_3^{org} \in \mathbb{R}^k$ it is specified that $u_3^{org} \in U_3 := \{u_3^{org} \in \mathbb{R}^k | u^{min}-u_1-u_2 \leq N_3 u_3^{org} \leq u^{max}-u_1-u_2\}$. It follows from this that: $u_1+u_2+u_3 \in U$.

The complete actuator command, which ensures that the primary goal is not affected by the secondary goal and the tertiary goal and the secondary goal for its part is not affected by the tertiary goal, is then preferably:

$$u=u_1+u_2+u_3.$$

A corresponding further development of the method according to the invention therefore provides that subsequently a complete control command u is calculated as follows: $u=u_1+u_2+u_3$.

This procedure can be generalized:
For the task with the highest priority it always applies that $$u_1 = D_1^\# u_{p,1}.$$

For the secondary task it applies that $$u_2^{org} = D_2^{190}(u_{p,2} - D_2 u_1),$$

$$N_2 = I - D_1^T (D_1^\#)^T,$$

$$u_2 = N_2 u_2^{org}.$$

For all other tasks (with i>2) it applies that $$u_i^{org} = D_i^\# (u_{p,i} - D_i \Sigma_{j=1}^{i-1} u_j),$$

$$N_i = \left(I - \begin{bmatrix} D_1 \\ \vdots \\ D_{i-1} \end{bmatrix}^T \left( \begin{bmatrix} D_1 \\ \vdots \\ D_{i-1} \end{bmatrix}^\# \right)^T \right),$$

$$u_i = N_i u_i^{org}.$$

A corresponding further development of the method according to the invention therefore provides that the null space $N_i(D)$, i>1 is calculated according to $$N_i(D) = \left(I - \begin{bmatrix} D_1 \\ \vdots \\ D_{i-1} \end{bmatrix}^T \left( \begin{bmatrix} D_1 \\ \vdots \\ D_{i-1} \end{bmatrix}^\# \right)^T \right) \in \mathbb{R}^{k \times k}.$$

Finally, the following is obtained as the complete actuator command $$u = \Sigma_{i=1}^n u_i.$$

The limit values are $$u_i \in U_i := \{u_i \in \mathbb{R}^k | u^{min} - u_\Sigma \leq N_i u_i \leq u^{max} - u_\Sigma\}$$

with $u_\Sigma = \Sigma_{j=1}^{i-1} u_j$.

Specifically, therefore, for solving a non-primary task, i>1, in a further development of the method according to the invention the following may be calculated:

$$u_i^{org} = D_i^\# (u_{p,i} - D_i \Sigma_{j=1}^{i-1} u_j)$$

$$u_i = N_i u_i^{org}$$

$$u = \Sigma_{i=1}^n u_i; \text{ with}$$

$$u_i \in U_i := \{u_i \in \mathbb{R}^k | u^{min} - u_\Sigma \leq N_i u_i \leq u^{max} - u_\Sigma\}$$

and with $$u_\Sigma = \Sigma_{j=1}^{i-1} u_j$$

Preferably, the method according to the invention is applied to an aircraft with multiple, k, propulsion units, preferably 18 propulsion units, k=18, which propulsion units form at least some of the actuators of the system.

For example, it may be provided in a further development of the method according to the invention that attitude control concerning rolling (in particular rolling angles) and pitching (in particular pitching angles) is prioritized over directional control concerning yawing (in particular the yaw rate) and vertical control concerning the flying altitude (in particular the climbing and descending rate). This is specifically explained in even more detail further below on the basis of FIGS. 1 and 2.

In particular, it may be provided here that $D_1 \in \mathbb{R}^{2 \times k}$ is chosen such that it represents a mapping of actuator control commands u onto the rolling and pitching moment, with $u_{p,1} \in \mathbb{R}^2$, and that $D_2 \in \mathbb{R}^{2 \times k}$ is chosen such that it represents a mapping of actuator control commands u onto the thrust and yawing moment, with $u_{p,2} \in \mathbb{R}^2$ (variant 1).

In another further development of the method, it may be provided that attitude control concerning rolling and pitching (in particular rolling angles and pitching angles) is prioritized over directional control concerning a yawing motion (in particular the yaw rate) and a total thrust.

In particular, it may be provided here that $D_1 \in \mathbb{R}^{2 \times k}$ is chosen such that it represents a mapping of actuator control commands u onto the rolling and pitching moment, with $u_{p,1} \in \mathbb{R}^2$, that $D_2 \in \mathbb{R}^{1 \times k}$ is chosen such that it represents a mapping of actuator control commands u onto the yawing moment, with $u_{p,2} \in \mathbb{R}$, and that $D_3 \in \mathbb{R}^{1 \times k}$ is chosen such that it represents a mapping of actuator control commands u onto the total thrust, with $u_{p,3} \in \mathbb{R}$ (variant 2).

In yet another further development of the method, it may also be provided that a total thrust is prioritized over attitude control concerning rolling and pitching (in particular rolling angles and pitching angles) and over directional control concerning a yawing motion (in particular the yaw rate).

It may be provided for this purpose that $D_1 \in \mathbb{R}^{1 \times k}$ is chosen such that it represents a mapping of actuator control commands u onto the total thrust, with, $u_{p,1} \in \mathbb{R}^2$, that $D_2 \in \mathbb{R}^{1 \times k}$ is chosen such that it represents a mapping of actuator control commands u onto the pitching moment, with $u_{p,2} \in \mathbb{R}$, that $D_3 \in \mathbb{R}^{1 \times k}$ is chosen such that it represents a mapping of actuator control commands u onto the rolling moment, with $u_{p,3} \in \mathbb{R}$, and that $D_4 \in \mathbb{R}^{1 \times k}$ is chosen such that it represents a mapping of actuator control commands u onto the yawing moment, with $u_{p,4} \in \mathbb{R}$ (variant 3).

The first two variants are aimed at resuming a stable flying position as soon as rolling and pitching angles have returned to a reasonable level. Because this may involve a loss of altitude, the strategy is possibly not suitable for cases in which the aerial vehicle is close to the ground.

By contrast, the third variant is well suited for cases in which a collision is unavoidable, and so instead of prioritizing thrust it can be attempted to reduce a collision speed in order to minimize damage to the aerial vehicle. It may also be attempted to reduce the pitching angle, which increases the crash safety for the pilot and passengers. The same applies to the rolling angle, whereas the yawing angle (directional angle) or yaw rate only has low priority in this case.

BRIEF DESCRIPTION OF THE DRAWINGS

Further properties and advantages of the invention result from the following description of the figures.

DETAILED DESCRIPTION

Figure 1:
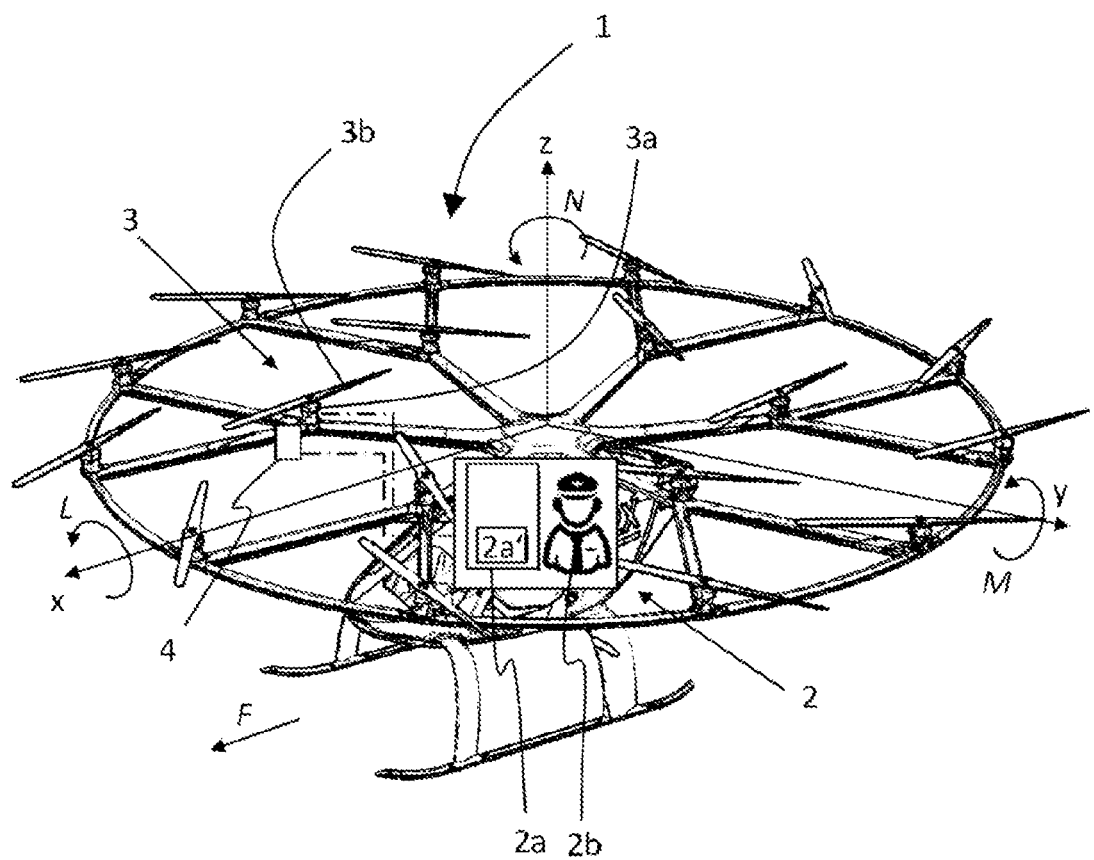
FIG. 1 shows a system or aerial vehicle according to the invention.

FIG. 1 shows a system or aerial vehicle 1 according to the invention in the form of a multicopter produced by the applicant with specifically 18 propulsion units (actuators). In FIG. 1, L, M and N denote the torques around the axes x, y and z (roll axis, pitch axis and yaw axis) of the aerial vehicle 1, and F denotes the total thrust. Reference character 2 symbolizes the main flight control unit of the aerial vehicle 1, which preferably comprises a control unit 2a according to the invention, which preferably has a control algorithm 2a' and as a result is set up for carrying out the method according to the invention and further developments thereof, in particular software technically. In the case of reference character 2b, a human pilot is also shown, which is not worth noting further in the present case. Reference character 3 refers to one of the 18 (without limitation, identical) propulsion units or actuators, each comprising an (electric) motor 3a and a rotor 3b. The aerial vehicle 1 is therefore an eVTOL—an electrically powered aerial vehicle with the capability of taking off and landing vertically ("vertical take-off and landing"). Reference character 4 refers to an exemplary sensor unit actively connected to the main flight control unit 2. In order to be able to take into account the available aerial vehicle states in a corresponding further development of the method according to the invention, a variety of such sensor units 4 may be provided, in particular inertial measuring units, GNSS, barometers, vibration sensors on the actuators, temperature sensors on the actuators, and the like.

The invention is in principle not limited in its application to aerial vehicles 1 as overdetermined systems.

Figure 2:
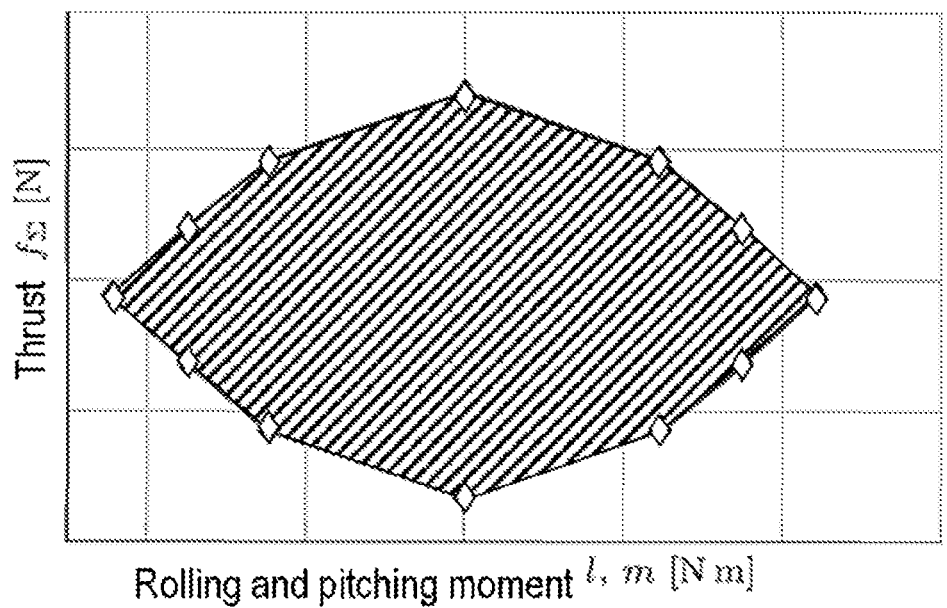
FIG. 2 illustrates the coupling of limit values of the pseudo-control commands.

FIG. 2 illustrates the case explained above, according to which, in the case of an aerial vehicle, in particular according to FIG. 1, under certain circumstances rolling angle control and pitching angle control are prioritized over yawing angles or yaw rate and thrust. According to FIG. 2, this is so because the limit values of the pseudo-control commands are coupled such that a great thrust requirement reduces the control range (the control volume, that is to say the shaded area) with respect to the rolling and pitching moments (abscissa).

For a regular multicopter, the attitude of the aerial vehicle also determines the alignment of the thrust vector. Therefore, the thrust requirement for compensating the weight of the aerial vehicle increases greatly if the attitude angle assumes large values, cf. the illustration in FIG. 3. If the thrust requirement exceeds the permissible limit values, the large attitude angle inevitably has the effect that the aerial vehicle 1 loses altitude. This loss of altitude can only be corrected again when the attitude angle has been reduced.

Figure 3:
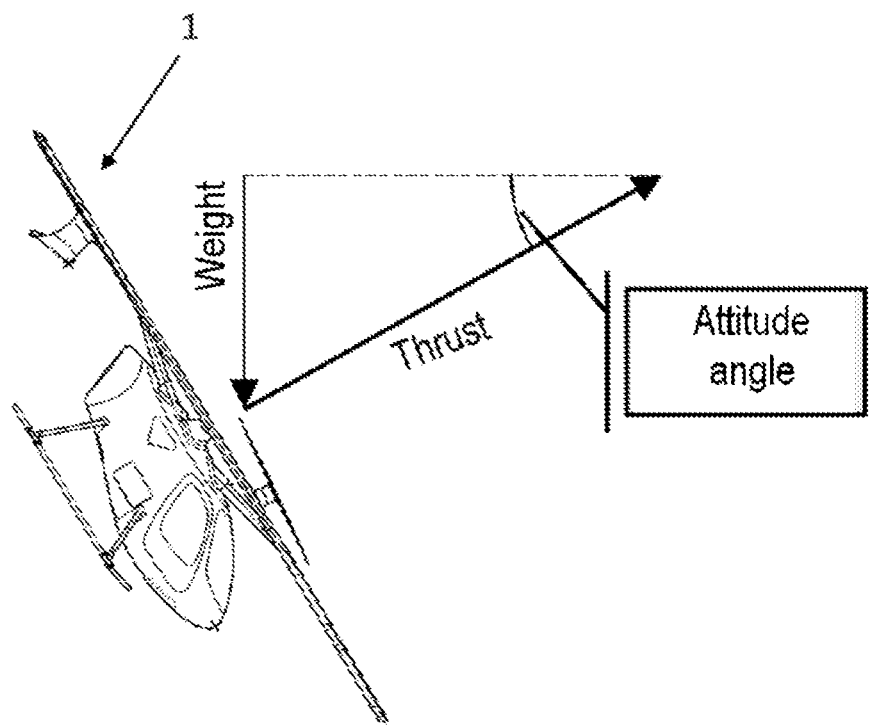
FIG. 3 shows the aerial vehicle from FIG. 1 in an extreme flying situation.
Figure 4:
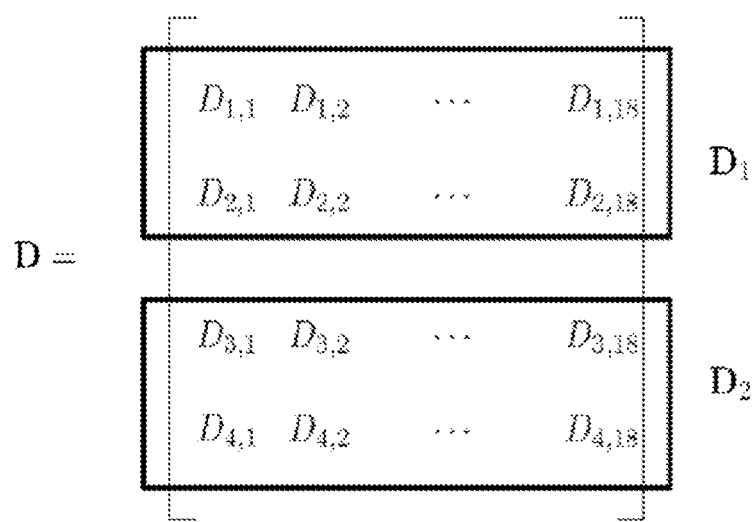
FIG. 4 shows a possibility for dividing up the control matrix.

If these aspects are combined, the result is that, in an extreme flying situation, as shown in FIG. 3, the attitude correction with respect to rolling and pitching angles should have priority over control concerning the other control axes (yaw and thrust). According to FIG. 4, in the case of the aerial vehicle shown with 18 rotors (cf. FIG. 1), the following procedures or assignments may therefore be adopted:

The control matrix is broken down (dissociated)—as shown in FIG. 4—into two sub-matrices $D_1$, $D_2$. In this case, $u_{p,1} \in \mathbb{R}^2$ corresponds to the rolling moment and the pitching moment. Consequently, $D_1 \in \mathbb{R}^{2 \times k}$, k=1, ..., 18, describes the mapping of the actuator commands u onto the rolling and pitching moments. $u_{p,2} \in \mathbb{R}^2$ corresponds to the yawing moment and the total thrust, and $D_2 \in \mathbb{R}^{2 \times k}$, k=1, ..., 18, correspondingly maps the actuator commands u onto the yawing moment and the thrust.

Figure 5:
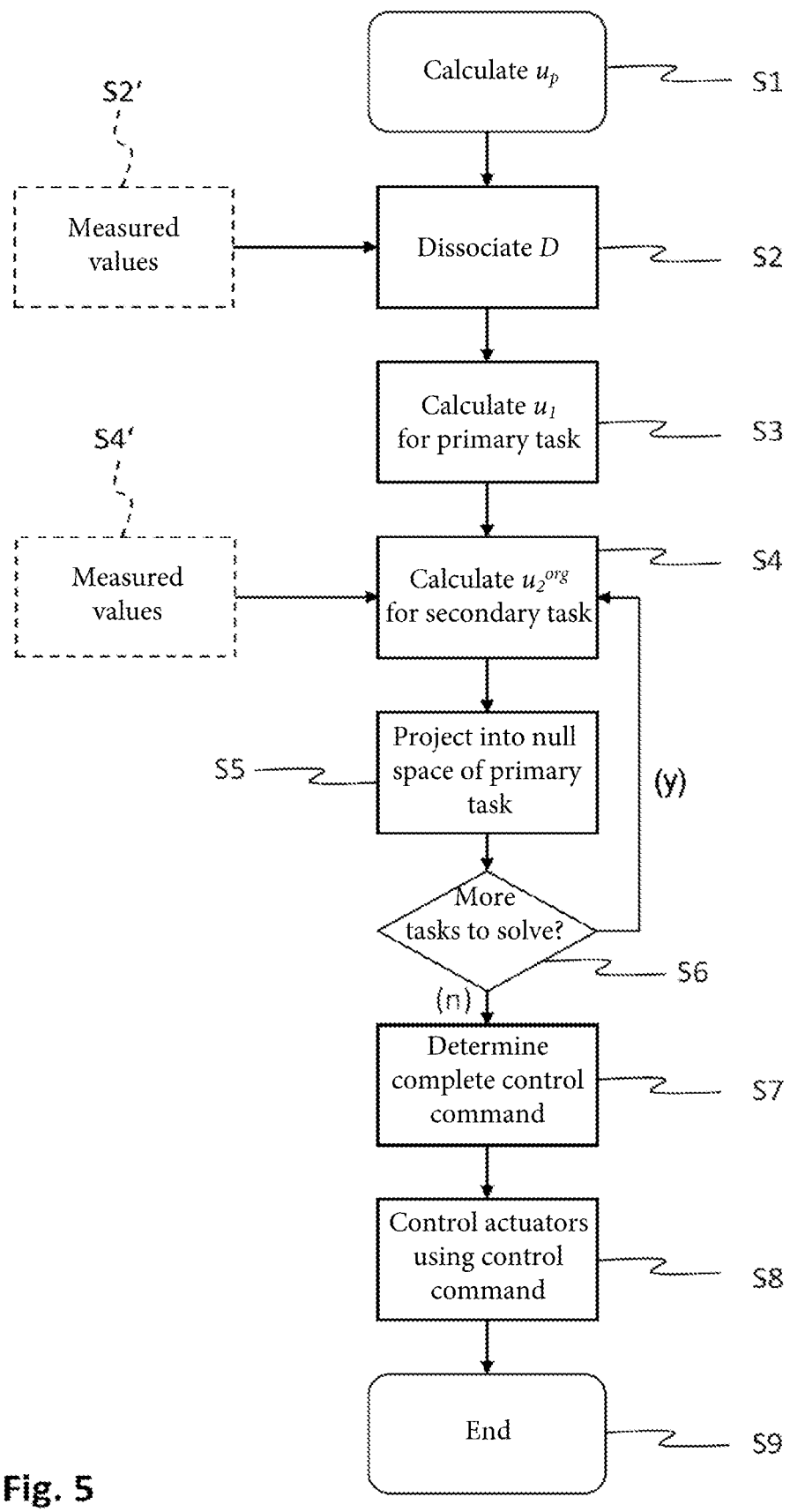
FIG. 5 shows a possible sequence of the method according to the invention.

FIG. 5 shows a possible sequence of the method according to the invention. It begins in step S1, wherein the pseudo-control command $u_p$ is calculated, as described above in detail. In step S2, the control matrix D is dissociated on the basis of the control prioritization, as described above by way of example. For this purpose, (sensor) measured values etc. from step S2' may be used, as likewise described. According to the measured values, the control prioritization may also be changed, as also described. In step S3, the calculation of $u_1 = D_1^\# u_{p,1}$ is performed to solve the primary task with the aid of the sub control matrix $D_1$, as specified. In step S4, the control command $u_2^{org}$ for the secondary task is calculated. For this purpose, (sensor) measured values etc. from step S4' may be used, for example measured temperature values, as likewise already described. Then, in step S5, the projection of the non-primary (secondary) task or of the corresponding control command $u_2^{org}$ into the null space of the primary task takes place, so that, if $u_2, u_2 \in \mathbb{R}^k$, $D_1 u_2 = 0$ represents a control command for the actuators for performing the non-primary task. This has also been described in detail further above and also applies correspondingly to the further, low-priority tasks.

Step S6 includes an inquiry as to whether still further subordinate (non-primary, for example tertiary) tasks are to be solved. If yes (y), steps S4 (or S4') and S5 are correspondingly adapted (for example with $u_3^{org}$ etc.) and repeated for the further task(s). As soon as the inquiry in step S6 is answered with no (n), the method jumps to after step S7, where the complete control command is determined: = $u_1 + u_2 + \ldots$, depending on the number of tasks solved (see above). In step S8, this complete control command is used for controlling the actuators, and the method ends with step S9.

The invention claimed is:

1. A method for controlling a system, which is overdetermined, with multiple power-restricted actuators, wherein the actuators perform at least one primary task and a number of non-primary tasks, the method comprising:
   a) determining a pseudo-control command $u_p \in \mathbb{R}^{p'}$ based on a physical model of a system, said pseudo-control command represents the torques (L, M, N) and a total thrust force (F) acting on the system,
   b) determining a control matrix D, $D \in \mathbb{R}^{p' \times k}$ according to $u_p = Du$, wherein u denotes actuator control commands,
   c) dissociating the control matrix D into sub control matrices $D_i$ according to $$D = \begin{bmatrix} D_1 \\ \vdots \\ D_q \end{bmatrix},$$

q≤p', so that $$u_p = \begin{bmatrix} u_{p,1} \\ \vdots \\ u_{p,q} \end{bmatrix}$$

and $u_{p,i} = D_i u$,
wherein the sub control matrices $D_i$ and corresponding sub pseudo-control commands $u_{p,i}$ for i=1 correspond to the primary task and for i>1 correspond to the at least one non-primary task and wherein a priority of the non-primary tasks decreases with increasing index i,
   d) determining actuator control commands for solving the primary task according to $u_1 = D_1^\# u_{p,1}$, where #denotes a matrix inversion and $u_1 \in \mathbb{R}^k$ comprises said actuator control commands which solve the primary task, with $u_1 \in U := \{u \in \mathbb{R}^k | u^{min} \le u \le u^{max}\}$
   e) projecting the non-primary tasks, i>1, into a null space of the primary task, i=1, and into respective null space of all of the non-primary tasks of higher priority, if present, so that $D_i u_j=0$, with $u_j \in \mathbb{R}^k$, j>i, comprises actuator control commands for performing a non-primary task, and f) providing the actuator control commands from d) and e) at the actuators.

2. The method as claimed in claim 1, further comprising first calculating $u_2^{org} \in \mathbb{R}^k$, in order to solve a first one of the non-primary tasks, according to $u_2^{org}=D_2^{\#}(u_{p,2}-D_2 u_1)$, and subsequently projecting $u_2^{org}$ onto the null space $N_2(D_1)$ of the sub control matrix $D_1$ according to $u_2=N_2 u_2^{org}$, wherein $N_2=I-D_1^T(D_1^{\#})^T$.

3. The method as claimed in claim 2, further comprising subsequently calculating a complete actuator control command u as follows:

$u=u_1+u_2$.

4. The method as claimed in claim 3, wherein for $u_2^{org}$ it is specified that $u_2^{org} \in U_2 := \{u_2^{org} \in \mathbb{R}^k | u^{min} - u_1 \leq N_2 u_2^{org} \leq u^{max} - u_1\}$.

5. The method as claimed in claim 2, further comprising subsequently calculating $u_3^{org} \in \mathbb{R}^k$ in order to solve a second one of the non-primary tasks, according to $u_3^{org}=D_3^{\#}(u_{p,3}-D_3(u_1-u_2))$, and subsequently projecting $u_3^{org}$ onto the null space $N_3(D_1,D_2)$ of the sub control matrices $D_1,D_2$ according to $u_3=N_3 u_2^{org}$, wherein $$N_3 = \left(I - \begin{bmatrix} D_1 \\ D_2 \end{bmatrix}^T \left(\begin{bmatrix} D_1 \\ D_2 \end{bmatrix}^{\#}\right)^T\right).$$

6. The method as claimed in claim 5, further comprising subsequently calculating a complete actuator control command u as follows: $u=u_1+u_2+u_3$.

7. The method as claimed in claim 6, wherein for $u_3^{org}$ it is specified that $u_3^{org} \in U_3 := \{u_3^{org} \in \mathbb{R}^k | u^{min} - u_1 - u_2 \leq N_3 u_3^{org} \leq u^{max} - u_1 - u_2\}$.

8. The method as claimed in claim 1, further comprising calculating the null space $N_i(D)$, i>1 according to $$N_i(D) = \left(I - \begin{bmatrix} D_1 \\ \vdots \\ D_{i-1} \end{bmatrix}^T \left(\begin{bmatrix} D_1 \\ \vdots \\ D_{i-1} \end{bmatrix}^{\#}\right)^T\right) \in \mathbb{R}^{k \times k}.$$

9. The method as claimed in claim 8, further comprising for solving a non-primary task, i>1, calculating:

$u_i^{org}=D_i^{\#}(u_{p,i}-D_i \Sigma_{j=1}^{i-1} u_j)$ $u_i=N_i u_i^{org}$;

$u=\Sigma_{i=1}^n u_i$; with $u_i \in U_i := \{u_i \in \mathbb{R}^k | u^{min} - u_\Sigma \leq N_i u_i \leq u^{max} - u_\Sigma\}$ and with $u_\Sigma=\Sigma_{j=1}^{i-1} u_j$.

10. The method as claimed in claim 1, wherein the method is applied to an aircraft (1) with multiple propulsion units (3), and said propulsion units form at least some of the actuators of the system.

11. The method as claimed in claim 1, further comprising prioritizing attitude control concerning rolling and pitching, over directional control concerning yawing and vertical control concerning a flying altitude.

12. The method as claimed in claim 11, further comprising selecting $D_1 \in \mathbb{R}^{2 \times k}$ such that it represents a mapping of the actuator control commands u onto a rolling and pitching moment, with $u_{p,1} \in \mathbb{R}^2$, and selecting $D_2 \in \mathbb{R}^{2 \times k}$ such that it represents a mapping of the actuator control commands u onto a thrust and yawing moment, with $u_{p,2} \in \mathbb{R}^2$.

13. The method as claimed in claim 10, further comprising prioritizing attitude control concerning rolling and pitching over directional control concerning yawing and a total thrust.

14. The method as claimed in claim 13, further comprising selecting $D_1 \in \mathbb{R}^{2 \times k}$ such that it represents a mapping of the actuator control commands u onto a rolling and pitching moment, with $u_{p,1} \in \mathbb{R}^2$, selecting $D_2 \in \mathbb{R}^{1 \times k}$ such that it represents a mapping of the actuator control commands u onto a yawing moment, with $u_{p,2} \in \mathbb{R}$, and selecting $D_3 \in \mathbb{R}^{1 \times k}$ such that it represents a mapping of the actuator control commands u onto the total thrust, with $u_{p,3} \in \mathbb{R}$.

15. The method as claimed in claim 10, further comprising prioritizing a total thrust over attitude control concerning rolling and pitching, and over directional control concerning yawing.

16. The method as claimed in claim 15, further comprising selecting $D_1 \in \mathbb{R}^{1 \times k}$ such that it represents a mapping of the actuator control commands u onto the total thrust, with $u_{p,1} \in \mathbb{R}^2$, selecting $D_2 \in \mathbb{R}^{1 \times k}$ such that it represents a mapping of the actuator control commands u onto a pitching moment, with $u_{p,2} \in \mathbb{R}$, selecting $D_3 \in \mathbb{R}^{1 \times k}$ such that it represents a mapping of the actuator control commands u onto a rolling moment, with $u_{p,3} \in \mathbb{R}$, and selecting $D_4 \in \mathbb{R}^{1 \times k}$ such that it represents a mapping of the actuator control commands u onto a yawing moment, with $u_{p,4} \in \mathbb{R}$.

17. A control unit (2a) for controlling a system, which is overdetermined, with multiple power-restricted actuators, wherein the actuators perform at least one primary task and at least one non-primary task, comprising a controller configured to a) determining a pseudo-control command $u_p \in \mathbb{R}^{p'}$ based on a physical model of a system, said pseudo-control command represents torques (L, M, N) and a total thrust force (F) acting on the system, b) determining a control matrix D, $D \in \mathbb{R}^{p' \times k}$, according to $u_p=Du$, wherein u denotes actuator control commands, c) dissociating the control matrix into sub control matrices $$D = \begin{bmatrix} D_1 \\ \vdots \\ D_q \end{bmatrix},$$

$q \leq p'$, so that $$u_p = \begin{bmatrix} u_{p,1} \\ \vdots \\ u_{p,q} \end{bmatrix}$$

and $u_{p,i} = D_i u$, wherein the sub control matrices $D_i$ and corresponding sub pseudo-control commands $u_{p,i}$ for i=1 correspond to the primary task and for i>1 correspond to the at least one non-primary task and wherein a priority of the non-primary tasks decreases with increasing index i, d) determining the actuator control commands for solving the primary task according to $u_1 = D_1^{\#} u_{p,1}$, where #denotes a matrix inversion and $u_1 \in \mathbb{R}^k$ comprises said actuator control commands which solve the primary task, with $u_1 \in U := \{u \in \mathbb{R}^k | u^{min} \leq u \leq u^{max}\}$, e) projecting the non-primary tasks, i>1, into a null space of the primary task, i=1, and into respective null space of all of the non-primary tasks of higher priority, if present, so that $D_i u_j = 0$, if $u_j \in \mathbb{R}^k$, j>i, comprises the actuator control commands for performing a non-primary task, and f) providing the actuator control commands from d) and e) at the actuators.

18. The control unit (2a) as claimed in claim 17, wherein the controller is further configured such that it first calculates $u_2^{org} \in \mathbb{R}^k$, in order to solve a first one of the non-primary tasks, according to $u_2^{org} = D_2^{\#}(u_{p,2} - D_2 u_1)$, and subsequently projects $u_2^{org}$ onto the null space $N_2(D_1)$ of the sub control matrix $D_1$ according to $u_2 = N_2 u_2^{org}$, wherein $N_2 = I - D_1^T (D_1^{\#})^T$.

19. The control unit (2a) as claimed in claim 17, further comprising at least one of devices (4) for at least one of measuring or determining parameters and states of the system or the actuators which are required for the determination of the pseudo-control command according to step a) connected to the controller.

20. An overdetermined system comprising multiple actuators actively connected to the control unit (2a) as claimed in claim 17.

21. An aircraft (1) comprising the overdetermined system as claimed in claim 20, wherein the actuators multiple propulsion units (3).

* * * * *